United States Patent Office 3,346,569
Patented Oct. 10, 1967

3,346,569
6β:19-OXIDO-PREGNENES
Albert Wettstein, Riehen, Georg Anner, Karl Heusler, and Jaroslav Kalvoda, Basel, Hellmut Ueberwasser, Riehen, and Jules Heer, Binningen, Switzerland, assignors to Ciba Corporation, New York, N.Y., a corporation of Delaware
No Drawing. Filed Sept. 7, 1962, Ser. No. 222,202
Claims priority, application Switzerland, June 2, 1961, 6,779/61; Sept. 18, 1961, 10,803/61; Sept. 22, 1961, 11,071/61; Jan. 9, 1962, 85/62
9 Claims. (Cl. 260—239.55)

This application is a continuation-in-part of our copending application Ser. No. 122,657, filed July 10, 1961, by Albert Wettstein et al., and now abandoned.

The present invention relates to novel $\Delta^4$-3-oxo-6β:19-oxido-pregnenes, more especially to compounds of the formula

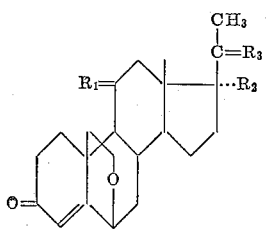

wherein $R_1$ stands for hydrogen, oxo or hydrogen together with hydroxy or acyloxy, $R_2$ stands for hydrogen, hydroxy, acyloxy or 16α:17α-epoxide groupings, $R_3$ stands for oxo or hydrogen together with hydroxy or acyloxy.

The acyloxy radicals mentioned above, representing esterified hydroxyl groups, are more especially those of aliphatic, cycloaliphatic, cycloaliphatic-aliphatic, araliphatic, aromatic or heterocyclic carboxylic acids containing at most 15 carbon atoms, such as for example formic, acetic, propionic, butyric, valeric, trimethylacetic, caproic, oenantic, decanoic, trifluoroacetic, carbonic-monomethyl- or ethyl ester, hexahydrobenzoic, cyclopentyl-propionic, phenyl-propionic benzoic or furoic acids.

The compounds of the present invention are extremely useful intermediates for the production of 19-nor-pregnanes to which class of compounds belong several well known progestational agents such as 19-nor-progesterones, 17α-hydroxy-19-nor-progesterone and especially its esters, 6-dehydro-19-nor-progesterone. However some of the compounds of the invention are also useful in themselves such as the 6β:19-oxido-11-oxo-progesterone or can be used for the production of useful 19-oxygenated progesterones such as 19-oxo-progesterone. The 6β:19-oxido-11-oxo- and the 19-oxo-derivatives of progesterone are capable for protecting against bacterial endotoxins even when administered at very low dosages.

The 19-nor-pregnenes are produced from the $\Delta^4$-3-oxo-6β:19-oxido-pregnenes of the present invention by reduction with zinc in acetic acid at slightly elevated temperature and by elimination of the angular C-19-substituent in the $\Delta^4$-3-oxo-19-hydroxy-pregnenes obtained in known manner, preferably after oxidizing the 19-hydroxy group to an aldehyde or acid function.

Among the $\Delta^4$-3-oxo-6β:19-oxido-pregnenes of the invention the following are particularly important: $\Delta^4$-3:20-dioxo-6β:19-oxido-pregnene, $\Delta^4$-3:20-dioxo-6β:19; 16α: 17α-bisoxido-pregnene, $\Delta^4$-3:20-dioxo-6β:19 - oxido - 17α-hydroxy-pregnene and its esters, more especially its acetate, propionate, caproate etc. $\Delta^4$-3:20-dioxo-6β:19-oxido-11α-hydroxy-pregnene and its esters, $\Delta^4$-3:11:20-trioxo-6β:19-oxido-pregnene.

The pregnenes of the invention are obtained e.g. by treating a 3-oxigenated 5α-halogen-6β-hydroxy-pregnane with lead tetraacetate in boiling benzene or cyclohexane for several hours to form the corresponding 3-oxygenated 5α-halogen-6β:19-oxido-steroid. These compounds may alternatively be prepared by reacting a 3-oxigenated 5α-halogen-6β-hydroxy-pregnane in boiling cyclohexane solution with monovalent positive iodine in the presence of free iodine and strong visible light for 10 to 90 minutes. The monovalent positive iodine may be obtained from N-iodo-succinimide or from silver acetate and iodine or mercuric acetate and iodine. An especially efficient method for the production of the 5α-halogen-6β:19-oxido-pregnanes consists in treating a 5α-halogen-6β-hydroxy-pregnane in an apolar solvent e.g. boiling cyclohexane solution with lead tetraacetate and iodine. The 3-oxigenated 5α-halogen-6β:19-oxido-pregnanes obtained are then transformed into the $\Delta^4$-3-oxo-pregnenes of the invention (if desired after introduction of other functional groups, e.g. a 17α-hydroxy group by the enolacetate-peracid method) by alkaline hydrolysis of a 3-acyloxy group present and oxidation of the 3-hydroxy group to a 3-oxo-group by means of chromium trioxide. Under the influence of a base such as pyridine or sodium acetate hydrohalic acid is easily eliminated from the 3-oxo-5α-halogen-6β:19-oxido-pregnanes to form $\Delta^4$-3-oxo-6β:19-oxido-pregnenes.

The following examples illustrate the invention. The temperatures are given in centigrades.

*Example 1*

A suspension of 10 grams of calcium carbonate and 30 grams of lead tetraacetate in 1 liter of cyclohexane is heated to 80° C., treated with 8.0 grams of iodine and then with 5 grams of 3β:20β-diacetoxy-5α-chloro-6β-hydroxy-5α-pregnane and the reaction mixture is refluxed for 3 hours and then cooled and filtered. The residue is washed with ether, the filtrate exracted with sodium thiosulfate solution of 10% strength, dried and evaporated under reduced pressure, to yield 6.1 grams of a solid crude product which on crystallization from acetone+ hexane yields pure 3β:20β-diacetoxy-5α-chloro-6β:19-oxido-5α-pregnane melting at 148 to 150° C. Optical rotation $[\alpha]_D = +25°$ (in chloroform).

A solution of 4.0 grams of this compound in methanol is treated with 4.0 grams of potassium carbonate and water and refluxed for one hour, then evaporated in a water-jet vacuum and from the residue the crude 3β:20β-dihydroxy-5α-chloro-6β:19-oxido-5α-pregnane melting at 237 to 240° C. is isolated in the usual manner.

A mixture of 1.0 gram of the above compound, 50 cc. of pyridine and 2.2 grams of chromium trioxide is stirred for 20 hours at 60° C. and the reaction mixture is then worked up as usual. Recrystallization of the crystalline residue yields pure $\Delta^4$-3:20-dioxo-6β:19-oxido-pregnene (6β:19-oxido-progesterone) melting at 142–143° C. Optical rotation $[\alpha]_D = -18.8°$ (in chloroform).

*Example 2*

(a) A suspension of 110 grams of lead tetraacetate and 50 grams of dry calcium carbonate in 4.5 liters of cyclohexane is stirred for about 40 minutes at the boil. 25 grams of 3β-acetoxy-5α-chloro-6β-hydroxy-20-oxo-pregnane and 32 grams of iodine are then added and the solution is kept at the boil while being irradiated with a 1000 watt lamp and stirred until the color of iodine has completely disappeared (about 30 to 90 minutes). The whole is then cooled, the undissolved salts are filtered off and the filter residue is rinsed with cyclohexane. The filtrate is washed with dilute sodium thiosulfate solution and with water, dried and evaporated in a water-jet vacuum. Crystallization of the crude product from ether yields 19.2 grams of pure 3β-acetoxy-5α-chloro-6β:19-oxido-20-oxo-pregnane melting at 150 to 153° C. From the mother liquor another 3.3 grams of a slightly less pure substance can be isolated. Optical rotation of the pure compound $[\alpha]_D = +65°$ (in chloroform). Its infra-red spectrum contains bands, inter alia, at 5.78, 5.88, 6.70, 8.13, 9.12, 9.66, 10.60, 10.86 and 11.75μ.

In an analogous manner there are obtained from 3β:17α - diacetoxy - 5α - chloro-6β-hydroxy-20-oxo-pregnane the 3β:17α - diacetoxy - 5α - chloro-6β:19-oxido - 20 - oxo - pregnane melting at 187 to 187.5° C., from 3β - acetoxy - 5α - chloro - 6β - hydroxy - 17α-valerianyloxy-20-oxo-pregnane the 3β-acetoxy - 5α - chloro-6β:19-oxido-17α-valerianyloxy-20-oxo-pregnane, and from 3β - acetoxy-5α-chloro-6β-hydroxy-17α-methoxy-20-oxo-pregnane the 3β - acetoxy-5α-chloro-6β:19-oxido-17α-methoxy-20-oxo-pregnane.

The chlorohydrin used as starting material is prepared in the following manner: A solution of 150 grams of pregnenolone acetate in 5 liters of ether is treated with 150 grams of chlorinated lime (containing 30% of active chlorine) and 8.2 liters of water and the reaction mixture is vigorously stirred. After 5 minutes 105 cc. of glacial acetic acid and after another 25 minutes 500 cc. of potassium iodide solution of 10% strength are added. Finally, the aqueous phase is separated, and the ethereal solution is washed with sodium thiosulfate solution of 10% strength, dilute sodium bicarbonate solution and with water, dried and evaporated in a water-jet vacuum. The residue is treated with 800 cc. of acetone and kept overnight at 0° C., to yield 47.5 grams, and from the mother liquor another 58 grams, of 3β-acetoxy-5α-chloro-6β-hydroxy-20-oxo-pregnane which melts at 196 to 197° C. after recrystallization from acetone. Optical rotation $[\alpha]_D = +25°$ (in chloroform). The infra-red spectrum of the compound displays bands, inter alia, at 2.75, 5.78, 5.88, 8.12, 8.68, 9.68 and 9.72μ.

In an analogous manner addition of hypochlorous acid on to the 17-α-acetoxy-pregnenolone acetate yields 3β:17α-diacetoxy-5α-chloro-6β-hydroxy-20-oxo-pregnane.

(b) 10.0 grams of 3β-acetoxy-5α-chloro-6β:19-oxido-20-oxo-pregnane in 180 cc. of acetic anhydride are treated with 4.0 grams of para-toluenesulfonic acid and heated in a bath maintained at 140 to 150° C. for 4 hours under a pressure of 50 to 60 mm. Hg, during which 90 cc. of solvent are distilled off. The reaction mixture is cooled, poured over ice and water and extracted with a 3:1-mixture of ether and methylene chloride. The extracts are washed with sodium bicarbonate solution and with water, dried and evaporated. The residue (10.40 grams) is dissolved in benzene and the solution is filtered through 100 grams of alumina. The eluates yield 10.1 grams of crude product which still contains about 15% of starting material. Crystallization from methylene chloride+ether+petroleum ether yields pure $\Delta^{17(20)}$-3β:20-diacetoxy-5α-chloro-6β:19-oxido-pregnene melting at 171 to 172° C. Optical rotation $[\alpha]_D = +18.4°$ (in chloroform). The infra-red spectrum of the compound contains bands, inter alia, at 5.76, 6.70, 7.30, 8.16, 9.13, 10.60 and 10.87μ.

A solution of 10.1 grams of crude $\Delta^{17(20)}$-3β:20-diacetoxy-5α-chloro-6β:19-oxido-pregnene in 250 cc. of benzene is treated with 240 cc. of an ethereal solution of perbenzoic acid (containing 2 molecular equivalents of per-acid calculated on the enol acetate) and kept for 5 hours at room temperature, after which time 70.2% of the amount of per-acid calculated for complete oxidation has been consumed. The reaction mixture is diluted with ice water, extracted with ether and the extracts are washed with water, sodium bicarbonate solution and water. The dried ethereal solution yields 9.90 grams of crude epoxide. After recrystallization from methylene chloride+ether pure 3β:20-diacetoxy - 5α-chloro-6β:19;17α:20-bisoxido-pregnane melts at 192 to 194° C. Optical rotation $[\alpha]_D = +14.4°$ (in chloroform). The infra-red spectrum of the compound contains bands, inter alia, at 5.76, 6.70, 7.30, 8.13, 8.58, 9.67, 10.66 and 10.81μ.

A mixture of 10.0 grams of crude 3β:20-diacetoxy-5α-chloro-6β:19;17α:20-bisoxido-pregnane, 800 cc. of alcohol and 45 cc. of aqueous sodium hydroxide solution of 2.4% strength is kept for one hour at room temperature, treated with 500 cc. of water and concentrated in a water-jet vacuum to half the volume. The concentrate is heated for 3 hours at 60° C., and the precipitate is filtered off, thoroughly washed with water and the filter residue is dried, to yield 9.85 grams of crude product which after crystallization from methylene chloride+methanol yields 3.90 grams of pure 3β:17α-dihydroxy-5α-chloro-6β:19-oxido-20-oxo-pregnane melting at 251 to 253°. Optical rotation $[\alpha]_D = +22.4°$ (in chloroform+alcohol). From the mother liquor another compound separates out which melts at 251 to 253° C.; it is probably a rearrangement product of the above diol.

A mixture of 200 mg. of 3β:17α-dihydroxy-5α-chloro-6β:19-oxido-20-oxo-pregnane, 1.0 cc. of acetic anhydride and 1.0 cc. of pyridine is stirred for 14 hours, with the starting material slowly passing into solution. The solution is then poured into ice water and extracted with a mixture of ether and methylene chloride. The extracts are washed with water, hydrochloric acid, sodium bicarbonate solution and with water and dried, to yield 210 mg. of crude product which is crystallized from ether+petroleum ether to yield 185 mg. of pure 3β-acetoxy-5α-chloro-6β:19-oxido-17α-hydroxy-20-oxo-pregnane melting at 166 to 167° C. Occasionally, the compound is obtained in a crystalline modification melting up to about 175° C. Optical rotation $[\alpha]_D = -2.1°$ (in chloroform). Its infra-red spectrum contains bands, inter alia, at 2.74, 2.82, 5.76, 5.85, 6.69, 7.30, 8.10, 9.65 and 10.86μ.

A mixture of 100 mg. of 3β:17α-dihydroxy-5α-chloro-6β:19-oxido-20-oxo-pregnane, 1.0 cc. of acetic anhydride and 100 mg. of para-toluene sulfonic acid is stirred for 2½ hours at 40° C., then poured into a mixture of 50 cc. of ice water and 0.5 cc. of pyridine, diluted with ether after 10 minutes, and the extracts are washed with sodium bicarbonate solution and with water. Recrystallization of the evaporation residue (106 mg.) from ether+petroleum ether yields 98 mg. of pure 3β:17α-diacetoxy-5α-chloro-6β:19-oxido-20-oxo-pregnane melting at 187 to 187.5° C. Optical rotation $[\alpha]_D = -6.2°$ (in chloroform). The infra-red spectrum of the compound contains bands, inter alia, at 5.77, 6.68, 7.79, 8.10, 9.65, 10.39 and 10.85μ.

The identical compound can also be prepared by acetylating 4.0 grams of 3β-acetoxy-5α-chloro-6β:19-oxido-17α-hydroxy-20-oxo-pregnane for 2½ hours at 40 to 50° C. in 40 cc. of acetic anhydride with addition of 4.0 grams of para-toluenesulfonic acid. The reaction mixture is cooled, poured into a mixture of 1 liter of ice water and 10 cc. of pyridine, the whole is stirred for 15 minutes and the precipitate is filtered off, washed with water, taken up in ether, and the solution is washed until it is neutral, dried and evaporated. The residue (3.85 grams) yields on crystallization from ether+petroleum ether 3.0 grams of 3β:17α-diacetoxy-5α - chloro - 6β:19 - oxido-20-oxo-pregnane melting at 187 to 187.5° C.

A mixture of 2.8 grams of the latter compound, 100 cc. of methanol and 500 mg. of potassium carbonate is stirred in 2.5 cc. of water for 13 hours at room temperature, then diluted with water, the methanol is distilled off in a water-jet vacuum, the residue is extracted with ether, and the extracts are washed with water, dried and evaporated. The residue (2.52 grams) yields on crystallization from methylene chloride+methanol 1.98 grams of 3β-hydroxy-5α-chloro-6β:19 - oxido - 17α - acetoxy - 20-oxo-pregnane melting at 238 to 241° C. After one recrystallization the melting point rises to 243 to 245° C.

A solution of 425 mg. of this compound in 15 cc. of acetone is treated at −5 to −6° C. with 0.5 cc. of a solution, diluted with water to 50 cc. of 13.3 grams chromium trioxide in 11.5 cc. of concentrated sulfuric acid. The whole is stirred for 30 minutes at −5° C., and a solution of 5.5 grams of crystalline sodium acetate in 10 cc. of water and 35 cc. of benzene is added. The organic phase is separated, washed with semi-saturated sodium chloride solution, dried and evaporated in a water-jet vacuum, to yield 450 mg. of crude 3:20-dioxo-5α-chloro-6β:19-oxido-17α-acetoxy-pregnane. The pure compound, obtained by recrystallization from methylene chloride+petroleum ether, melts at 156 to 158° C. with decomposition, then solidifies again and melts finally at 185 to 190° C. The infra-red spectrum of the compound contains bands, inter alia, at 5.84, 6.75, 6.82, 7.35, 8.15, 8.30, 9.10, 9.32, 9.70, 10.35 and 11.00μ.

A solution of 350 mg. of 3:20-dioxo-5α-chloro-6β:19-oxido-17α-acetoxy-pregnane in 100 cc. of methanol is treated with a solution of 600 mg. of potassium acetate in 70 cc. of water and while stirring about half the solvent is first distilled off and the remainder is evaporated to dryness in a water-jet vacuum. The residue is then dissolved in 70 cc. of water and a mixture of ether+methylene chloride 3:1, the organic phase is washed with water, dried and evaporated, to yield 308 mg. of a crude product which on recrystallization from ether+petroleum ether yields in two portions a total of 275 mg. of pure $\Delta^4$-3:20-dioxo-6β:19-oxido-17α-acetoxy-pregnene melting at 190 to 192° C. Optical rotation $[\alpha]_D$=−109° (in chloroform). The infra-red spectrum of the compound contains bands, inter alia, at 5.75, 5.82, 5.98, 7.30, 807, 8.35, 9.07, 9.75, 10.35, 10.55, 11.37 and 12.30μ.

*Example 3*

5.0 grams of the 18:20-lactone of 3β-acetoxy-5α-chloro-6β:20-dihydroxy-5α-pregnane-18-acid are reacted in 1.5 liters of cyclohexane with lead tetraacetate and iodine as described in Example 2, part (a). When the crude product obtained as described in that example is crystallized from benzene, it yields the pure 18:20-lactone of 3β-acetoxy-5α-chloro-6β:19-oxido-20β-hydroxy-5α-pregnane-18-acid melting at 229 to 234° C. Optical rotation $[\alpha]_D$=−48.3° (in chloroform).

When the latter product is hydrolyzed with potassium carbonate in methanol it yields the 18:20-lactone of 3β:20β-dihydroxy-5α-chloro-6β:19-oxido-5α-pregnane-18-acid which is directly oxidized with chromic acid+sulfuric acid in acetone at 0° C. to the crude 18:20-lactone of 3-oxo-5α-chloro-6β:19-oxido-20β-hydroxy-5α-pregnane-18-acid. From the latter product hydrochloric acid is eliminated by boiling for one hour in pyridine, whereupon there is obtained for the 18:20-lactone of $\Delta^4$-3-oxo-6β:19-oxido-20-β-hydroxy-pregnene-18-acid which, after having been recrystallized from methylene chloride +ether, melts at 259 to 260° C. Optical rotation $[\alpha]_D$=−111° (in chloroform).

The 5α-chloro-6β-hydroxy compound used as starting material is obtained as described in Example 2, part (a), by adding hypochlorous acid on to the 18:20-lactone of $\Delta^5$-3β-acetoxy-20β-hydroxy-pregnene-18-acid; this compound is prepared by treating $\Delta^5$-3β-acetoxy-20β-hydroxy-pregnene with lead tetraacetate and iodine in boiling cyclohexane and subsequent oxidation with chromium trioxide and pyridine with addition of silver chromate at 60° C. After having been recrystallized from methylene chloride+ether the pure 18:20-lactone of 3β-acetoxy-5α-chloro-6β-hydroxy-20β-hydroxy-5α-pregnane-18-acid melts at 227 to 228° C. Optical rotation $[\alpha]_D$=−48.3 (in chloroform).

*Example 4*

3 grams of 3β-acetoxy-5α-chloro-6β-hydroxy-16:17α-oxido-20-oxo-5α-pregnane are reacted as described in Example 2, part (a), with lead tetracetate and iodine in cyclohexane, to yield 3.5 grams of a crude product which on recrystallization from methylene chloride+ether yields 3β-acetoxy-5α-chloro-6β:19;16:17-α-bisoxido-20-oxopregnane melting at 230 to 233° C. Optical rotation $[\alpha]_D$=+36.3° (in chloroform).

Hydrolysis of this compound with potassium carbonate in methanol yields the crude 3β-hydroxy-5α-chloro-6β:19;16:17α-bisoxido-20-oxo-5α-pregnane (melting at 241 to 247° C.), which upon oxidation with chromium trioxide in pyridine as described in Example 1, affords the $\Delta^4$-3:20-dioxo-6β:19;16:17α-bisoxido-pregnene( 6β:19;16:17α-bisoxido-progesterone) melting at 154 to 156°° C.

The 5α-chloro compound used as starting material is prepared by adding hypochlorous acid on to the known $\Delta^5$-3β-acetoxy-16:17α-oxido-20-oxo-pregnene as described in Example 2, part (a). After recrystallization from acetone+hexane the resulting pure 3β-acetoxy-5α-chloro-6β-hydroxy-16:17α-oxido-20-oxo-5α-pregnane melts at 194 to 198° C. Optical rotation $[\alpha]_D$=−7.8° (in chloroform).

*Example 5*

A suspension of 17.5 grams of lead tetracetate and 8.0 grams of calcium carbonate in 800 cc. of cyclohexane is first heated for 30 minutes to boiling point while stirring. 4.0 grams 3β:11α:20β-triacetoxy-5α-chloro-6β-hydroxy-pregnane and 5.13 grams of iodine are then added and the mixture is heated for another hour to boiling point while being stirred and exposed to a 500-watt lamp, the color of the iodine slowly disappearing. After the reaction time has expired, the mixture is cooled, the insoluble salts are separated by filtration and the filtrate is washed with 10% sodium thiosulfate solution and with water. The aqueous solutions are extracted once more with ether and the combined organic solutions are dried and evaporated in a water-jet vacuum. The partly crystallizing crude product obtained (6.146 grams) is dissolved in 100 cc. of glacial acetic acid to reduce the starting material contained therein and the solution is stirred for 2 hours at 80° C. after adding 10 grams of zinc dust. The undissolved zinc is then filtered off and the filtrate is diluted with methylene chloride and washed with sodium bicarbonate solution and with water. 4.253 grams of crude product are obtained from the dried organic solutions after evaporation. By crystallization from ether, 923 mg. of 3β:11α:20β-triacetoxy-5α-chloro-6β:19-oxidopregnane having a melting point of 228–230° C. can be separated therefrom (conversion from 185° C.; $[\alpha]_D$=−6.2° (in chloroform); IR bands inter alia at 5.77μ and 8.09μ (acetates), 9.63μ; 9.75μ and 10.84μ.

The mother liquor is evaporated to dryness and chromatographed on 100 grams of aluminum oxide. With 900 cc. of hexane, 900 cc. of hexane-benzene mixture (4:1) only 81 mg. of oily by-products are eluted. From the fractions eluted with another 300 cc. of benzene-hexane mixture (2:1) there are obtained by crystallization from aqueous methanol 119 mg. of $\Delta^5$-3β:11α20β-triacetoxypregnene, which has been produced by zinc reduction of the 5α-chloro-6β-hydroxy compound. The following 300 cc. of benzene-hexane mixture (2:1) and 300 cc. of benzene contain mixtures of substances, while the evaporation residues of the fractions eluted with 900 cc. of benzene and 600 cc. of benzene-ethyl acetate mixture (9:1), when crystallized from ether, yield a further 411 mg. of the above-described 3β:11α:20β-triacetoxy-5α-chloro-6β:19-oxido-pregnane. Finally from the fractions eluted with benzene-ethyl acetate mixture (1:1), with ethyl acetate and with methanol 718 mg. of 3β:11α:20β-triacetoxy-5α-chloro-6β:19-oxido-19-hydroxypregnane having a melting point of 232–233° C. are obtained by crystallization from methylene chloride-ether; $[\alpha]_D^{25}$=−13.2° (in chloroform-alcohol in a ratio 1:1). IR bands inter alia at 2.79μ and 2.93μ (OH), 5.78μ and 8.12μ (acetates); 9.30μ; 9.70μ, 10.55μ and 10.91μ.

The 3β:11α:20β-triacetoxy-5α-chloro-6β-hydroxypregnane employed as starting material is prepared as follows: 18.71 grams of Δ⁴-3-oxo-11α-acetoxy-20β-hydroxypregnene are heated to boiling point in 100 cc. of isopropenyl acetate after adding 0.1 cc. of concentrated sulfuric acid. After one hour, 10 cc. of solvent are distilled off, boiling is then continued for another hour under reflux and the solution is then evaporated in a water-jet vacuum after adding 500 mg. of anhydrous sodium acetate. The residue is taken up in methylene chloride and the solution is washed with water, dried and once more evaporated. From the crude product (21 grams), 13.66 grams of pure Δ³,⁵-3:11α:20β-triacetoxy-pregnatriene having a melting point of 145–150° C. are obtained by crystallization from ether; [α]$_D^{25}$=−144.3° (in chloroform); UV maximum at 235 mμ (ε=19500); IR bands inter alia at 5.77μ (with shoulder at 5.68μ) and 8.16μ (acetates), 9.76μ; 10.40μ and 10.83μ.

12.0 grams of this enol acetate are dissolved in 900 cc. of alcohol. A solution of 6.0 grams of sodium borohydride in 120 cc. of 70% aqueous alcohol is added to the solution, which has been cooled to +5° C., and the reaction mixture is allowed to stand for 3 days at 0° C. 10 cc. of glacial acetic acid are then dropped in while stirring and the reaction mixture is concentrated in a water-jet vacuum to about 100 cc., diluted with methylene chloride and washed with water. 11.52 grams of a residue are obtained from the dried methylene chloride solution after evaporation and from this 9.78 grams of pure Δ⁵-3β-hydroxy-11α:20β-diacetoxypregnene can be isolated by crystallization from ether. The compound, after being dissolved once more in methanol and allowed to crystallize, melts at 162–165° C. [α]$_D^{25}$=−69.6° (in chloroform); IR bands inter alia at 2.74μ (OH), 5.78μ and 8.09μ (acetates); 9.76μ and 10.45μ.

9.78 grams of this compound are allowed to stand overnight at room temperature in 50 cc. of pyridine and 30 cc. of acetic anhydride. The reaction mixture is then evaporated to dryness in a water-jet vacuum and the residue is crystallized from aqueous methanol. 10.1 grams of Δ⁵-3β:11α:20β-triacetoxypregnene having a melting point of 141–143° C. are obtained; [α]$_D^{25}$=−59.4° (in chloroform). IR bands inter alia at 5.78μ and 8.09μ (acetates), 9.76μ; 10.44μ and 10.93μ.

3.0 grams of Δ⁵-3β:11α:20β-triacetoxypregnene are dissolved in 180 cc. of ether. After adding 180 cc. of water and 3.0 grams of chlorinated lime, the reaction solution is thoroughly stirred and 2.1 cc. of glacial acetic acid are then added. The two phases are then well mixed for 40 minutes with vibromixer, 50 cc. of 2% sodium thiosulfate solution and 50 cc. of 5% potassium iodide solution are then added, separation is carried out and the organic solution is washed several times with water. 1.78 grams of 3β:11α:20β - triacetoxy - 5α-chloro-6β-hydroxypregnane having a melting point of 225–227° C. are obtained from the evaporation residue (3.417 grams) by crystallization from ether; [α]$_D^{25}$=−43.2° (in chloroform); IR bands inter alia at 2.74μ (OH); 5.78μ and 8.09μ (acetates); 9.30μ; 9.56μ; 9.75μ and 10.45μ.

*Example 6*

250 mg. of 3β:11α:20β-triacetoxy-5α-chloro-6β:19-oxidopregnane are dissolved in 50 cc. of methanol and the solution is boiled under reflux for 10 hours after adding 500 mg. of potassium carbonate and 12.5 cc. of water. 1.0 cc. of glacial acetic acid is then added, the mixture is evaporated to about 15 cc. in a water-jet vacuum and diluted with methylene chloride and water, separation is carried out and washing to neutrality with dilute sodium bicarbonate solution, and the organic solution is dried and evaporated. 160 mg. of crystallized 3β:11α:20β-trihydroxy-5α-chloro-6β:19-oxidopregnane, which is precipitated from methanol-ether in methanol-containing crystals having a melting point of 264–266° C., are obtained; [α]$_D^{25}$=−25.9° (in chloroform): IR bands inter alia at 3.03μ (OH), 9.15μ; 9.63μ; 9.80μ and another 10 bands between 10.24μ and 12.60μ (in Nujol).

295 mg. of crude 3β:11α:20β-trihydroxy-5α-chloro-6β:19-oxidopregnane are dissolved in 100 cc. of acetone and stirred at 0° C. for 15 minutes after adding 1.0 cc. of a 26.6% solution of chromium trioxide in sulfuric acid of 42% strength. 3.0 cc. of isopropanol are then added, stirring is continued for another 5 minutes at 0° C., a solution of 2.0 grams of crystalline sodium acetate in 10 cc. of water is added and the reaction mixture is concentrated to about 30 cc. in a water-jet vacuum and diluted with methylene chloride and the organic solution is washed with water, dried and evaporated (residue: 288 mg.). The 3:11:20 - trioxo-5α-chloro-6β:19-oxidopregnane obtained in this way melts, after being dissolved in methylene chloride-ether and allowed to crystallize, within a few degrees between 130 and 170° C. with decomposition, according to the rate of heating; [α]$_D^{25}$=+167° (in chloroform); IR bands inter alia at 5.84μ (with shoulder at 5.80μ); 6.68μ; 7.38μ; 8.55μ; 9.12μ; 9.68μ and 10.56μ.

200 mg. of crude 3:11:20-trioxo-5α-chloro-6β:19-oxidopregnane are suspended in 30 cc. of methanol and the mixture is stirred for 30 minutes at 60° C. after adding 400 mg. of crystalline sodium acetate and 1.5 cc. of water. The solution is then concentrated and diluted with methylene chloride and the extract is washed with water, dried and evaporated. 180 mg. of crystallized Δ⁴-3:11:20-trioxo-6β:19-oxidopregnene, which melts at 265–268° C. after dissolution in methylene chloride-ether and crystallization, are obtained. [α]$_D^{25}$=−13.4° (in chloroform); UV maximum at 236 mμ (ε=11800); IR bands inter alia at 5.84μ (11- and 20-ketone); 5.95μ (3-ketone), 6.72μ; 8.33μ; 8.61μ; 9.75μ and 11.41μ.

*Example 7*

500 mg. of 3β:11α:20β-triacetoxy-5α-chloro-6β:19-oxidopregnane are dissolved in 100 cc. of methanol and allowed to stand for 18 hours at 25° C. after adding a solution of 1.0 gram of potassium carbonate in 25 cc. of water. 2 cc. of glacial acetic acid are then added, the reaction mixture is concentrated to about 20 cc. in a water-jet vacuum and diluted with methylene chloride and the organic solution is washed with water, sodium bicarbonate solution and water. From the residue of the dried methylene chloride solution there are obtained by crystallization from aqueous methanol 110 mg. of 3β-hydroxy-5α-chloro-6β:19-oxido-11α:20β-diacetoxypregnane in hydrous crystals which lose water of crystallization at 114–116° C. and melt at 168–170° C.; [α]$_D^{25}$=−20.2° (in chloroform); IR bands inter alia at 2.78μ (OH); 5.77μ and 8.11μ (acetates); 9.52μ; 9.78μ and 10.93μ.

The mother liquor which, in addition to further amounts of the above compound, also contains 3β:20β-dihydroxy-5α-chloro-6β:19-oxido-11α-acetoxypregnane, is evaporated to dryness and the residue (340 mg.) is dissolved in 30 cc. of acetone. 1.0 cc. of a 26.6% solution of chromium trioxide in sulfuric acid of 42% strength is added to the solution, which has been cooled to 0° C., and stirring is carried out for 15 minutes at 0° C. 3.0 cc. of isopropanol are then added, dilution with methylene chloride is carried out after another 5 minutes and the solution is washed several times with water. The dried methylene chloride solution is evaporated to dryness and the residue (312 mg.), which contains 3-oxo-5α-chloro-6β:19-oxido-11α:20β - diacetoxypregnane and 3:20 - dioxo - 5α-chloro-6β:19-oxido-11α-acetoxypregnane, is dissolved in 30 cc. of methanol and heated for one hour to 60° C. after adding a solution of 500 mg. of crystalline sodium acetate in 6 cc. of water. The mixture is then concentrated in a water-jet vacuum, diluted with methylene chloride and washed several times with water. 286 mg. of crude product are obtained from the dried methylene chloride solution after evaporation. By repeated crystallization from ether-methylene chloride, 26 mg. of pure Δ⁴-3-oxo-6β:19-oxido-11α:20β-diacetoxypregnene having a melting point of 274–280° C. can be isolated therefrom. UV maximum at 235 mμ (ε=12600); IR bands inter alia at 5.78μ and 8.11μ (acetates); 5.96μ (3-ketone); 6.74μ; 9.26μ; 9.75μ; 10.43μ and 11.40μ.

The mother liquor is evaporated to dryness and the residue, dissolved in benzene, is chromatographed on 10 grams of aluminum oxide. From the fraction eluted with benzene $\Delta^4$ - 3:20 - dioxo - 6β:19 - oxido - 11α -acetoxy-pregnene having a melting point of 187–189° C. can be isolated by crystallization from ether-methylene chloride; $[\alpha]_D^{25}=+86.6°$ (in chloroform); UV maximum at 237 mμ (ε=11500); 5.95μ (3-ketone); 6.27μ; 7.27μ; 8.09μ; 9.28μ; 9.75μ; 10.35μ; 10.62μ; 10.85μ; and 11.40μ.

Further amounts of the above-described 11α:20β-diacetate are precipitated from the mother liquor of the same fraction on standing for a long time.

*Example 8*

A solution of 1.48 grams of crude 3β:11α:20β-trihydroxy-5α-chloro-6β:19-oxidopregnane in 430 cc. of acetone is cooled to 5° C., mixed with 4.3 cc. of a 26.6% solution of chromium trioxide in sulfuric acid of 42% strength, and the whole is stirred for 1 hour at 0 to 5° C. 13 cc. of isopropanol are then dropped in and then a solution of 4.3 grams of potassium acetate in 45 cc. of water, the whole is concentrated in a water-jet vacuum to about 35 cc. and repeatedly extracted with methylene chloride. The extracts are washed with water and dried, to yield 1.352 grams of crude 3:11:20-trioxo-5α-chloro-6β:19-oxidopregnane which is dissolved in 50 cc. of pyridine, and the solution is heated for 1 hour at 100° C., then concentrated in a water-jet vacuum to about 10 cc. and extracted with methylene chloride. The extracts are washed with N-hydrochloric acid and with water, dried and evaporated. The residue (1.351 grams) yields on crystallization from methylene chloride+ether 795 mg. of $\Delta^4$-3:11:20-trioxo-6β:19-oxidopregnene melting at 190–191° C. Optical rotation $[\alpha]_D=+134°$ (in chloroform). Ultraviolet maximum at 236 mμ (ε=11750). Infra-red bands inter alia at 5.83, 5.94, 6.70, 7.33, 8.30, 8.62, 9.68, 9.78 and 11.40μ.

What is claimed is:
1. $\Delta^4$-3-oxo-6β:19-oxido-pregnenes of the formula

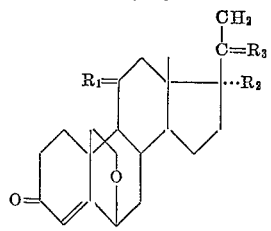

wherein $R_1$ stands for a member selected from the group consisting of hydrogen, oxo, hydrogen together with hydroxy and hydrogen together with acyloxy, $R_2$ stands for a member selected from the group consisting of hydrogen, hydroxy, acyloxy and a 16:17α-oxido group, $R_3$ stands for a member selected from the group consisting of oxo, hydrogen together with hydroxy and hydrogen together with acyloxy.

2. $\Delta^4$-3:20-dioxo-6β:19-oxido-pregnene.
3. $\Delta^4$-3:20-dioxo-6β:19-oxido-17α-hydroxy-pregnene.
4. $\Delta^4$-3:20-dioxo-6β:19-oxido-17α-acetoxy-pregnene.
5. $\Delta^4$-3:20-dioxo-6β:19;16:17α-bisoxido-pregnene.
6. $\Delta^4$-3-oxo-6β:19-oxido-11α:20β-diacetoxy-pregnene.
7. $\Delta^4$-3:20-dioxo-6β:19-oxido-11α-acetoxy-pregnene.
8. $\Delta^4$-3:11:20-trioxo-6β:19-oxido-pregnene.
9. $\Delta^4$ - 3:20 - dioxo-6β:19-oxido-17α-capronyloxy-pregnene.

References Cited

UNITED STATES PATENTS

| 2,837,464 | 6/1958 | Nobile | 195—51 |
| 3,001,989 | 9/1961 | Ringold et al. | 260—239.55 |
| 3,008,957 | 11/1961 | Ringold et al. | 260—239.55 |

OTHER REFERENCES

Holysz, J. Am. Chem. Soc., vol. 75 (1953), page 4432.

ELBERT L. ROBERTS, *Primary Examiner*.

LEWIS GOTTS, *Examiner*.

UNITED STATES PATENT OFFICE
CERTIFICATE OF CORRECTION

Patent No. 3,346,569   Dated October 10, 1967

Inventor(s) Albert Wettstein et al

It is certified that error appears in the above-identified patent and that said Letters Patent are hereby corrected as shown below:

Column 10, in the formula of claim 1

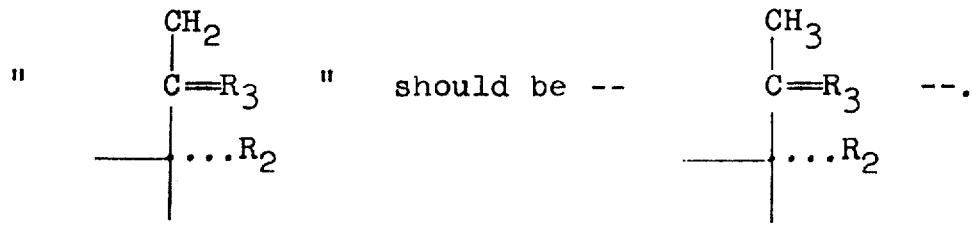

Signed and sealed MAR 3 - 1970

(SEAL)
Attest:

Edward M. Fletcher, Jr.
Attesting Officer

WILLIAM E. SCHUYLER, JR
Commissioner of Patents